May 15, 1951 A. W. KIMBELL 2,552,794
NUT DEVICE
Filed March 8, 1946 2 Sheets-Sheet 1
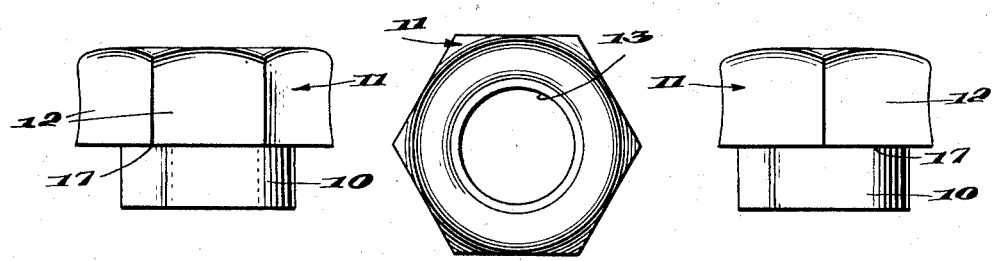
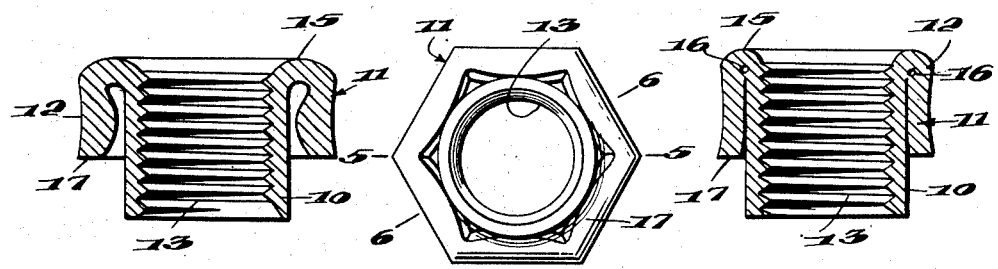
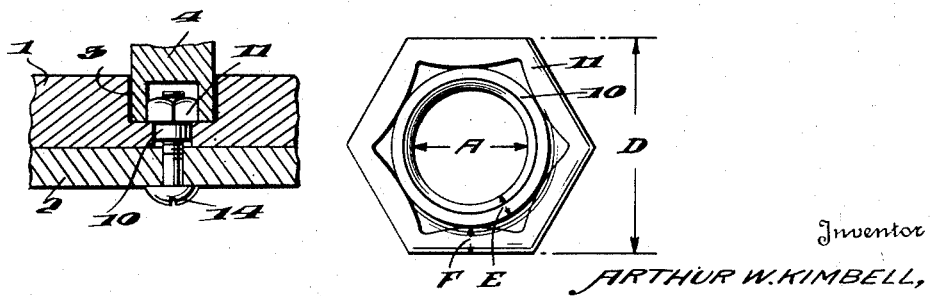
Inventor
ARTHUR W. KIMBELL,
By John Todd
Attorney May 15, 1951  A. W. KIMBELL  2,552,794
NUT DEVICE Filed March 8, 1946  2 Sheets-Sheet 2

Inventor
ARTHUR W. KIMBELL,
By John Todd
Attorney

Patented May 15, 1951

2,552,794

UNITED STATES PATENT OFFICE 2,552,794

NUT DEVICE

Arthur W. Kimbell, West Newton, Mass., assignor to United-Carr Fastener Corporation, Cambridge, Mass., a corporation of Massachusetts Application March 8, 1946, Serial No. 653,009

1 Claim. (Cl. 85—32)

The present invention relates to sheet metal nuts for screw-threaded fastenings and aims generally to improve existing nut devices of that type.

One of the objects of the invention is the provision of a sheet metal nut having a tubular interiorly threaded screw-receiving barrel and a surrounding peripheral polygonal wall, preferably of hexagonal shape possessing a definite relation of head diameter to screw diameter as to be turned by a wrench for a standard nut made from solid stock and of the same screw diameter.

A further object of the invention is the provision of an improved sheet metal nut having a work-bearing face of relatively large area for a nut of given head and screw diameter.

A further object of the invention is the provision of a sheet metal nut having a polygonal or hexagonal head which will possess maximum strength, lightness of weight and which may be simply and economically manufactured.

Other aims and advantages of the invention will be apparent to persons skilled in the art from a consideration of the accompanying drawings and annexed specification, illustrating and describing preferred embodiments of the invention.

In the drawings:

Fig. 1 is a side elevation of a sheet metal hexagonal nut constructed in accordance with the invention;

Fig. 2 is a top plan view of the hexagonal nut shown in Fig. 1;

Fig. 3 is a side elevation of the nut shown in Figs. 1 and 2 but viewed from a plane normal to a diameter across the flat sides;

Fig. 4 is a bottom plan view of the nut shown in Figs. 1, 2 and 3;

Fig. 5 is a vertical sectional view of the nut as taken on the line 5—5 of Fig. 4;

Fig. 6 is a vertical sectional view of the nut as taken on the line 6—6 of Fig. 4;

Fig. 7 is a sectional view of one typical installation illustrating the applicability of the nut of the invention as used with a standard screw-threaded fastening;

Fig. 8 is a diagrammatic view similar to Fig. 4;

Figure 9:
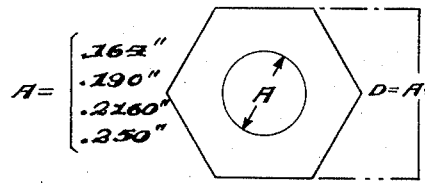
Figure 10:
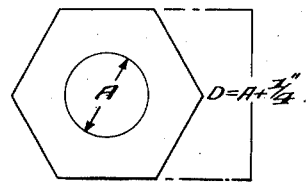
Figure 11:
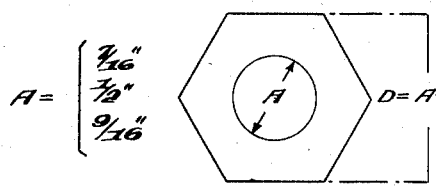
Figure 12:
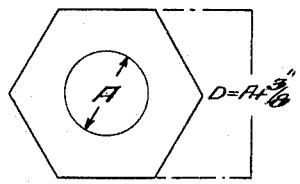
Figure 13:
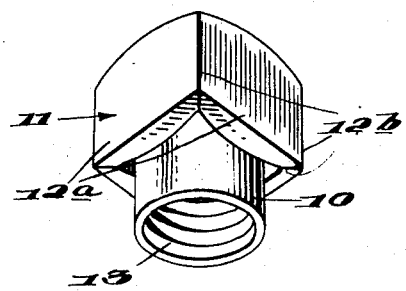
Figure 14:
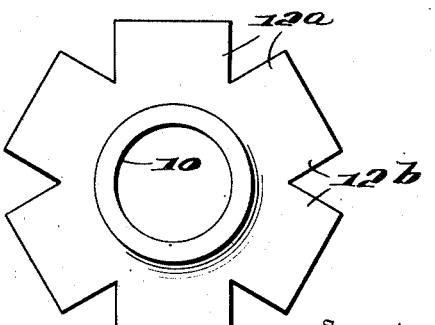

Fig. 9 is a diagrammatic view illustrating the normal relative diameter of the head in relation to the screw diameter for number 8, 10, 12 and ¼" hexagonal nuts having screw diameters of 0.164", 0.190" and 0.2160", and 0.250" respectively;

Fig. 10 is a diagrammatic view illustrating the relative normal diameter of the head in relation to the screw diameter for $\frac{5}{16}$" and ⅜" hexagonal nuts;

Fig. 11 is a diagrammatic view, similar to Figs. 9 and 10, illustrating the relative normal diameter of the head in relation to the screw diameter for $\frac{7}{16}$", ½" and $\frac{9}{16}$" hexagonal nuts;

Fig. 12 is a diagrammatic view similar to Figs. 9, 10 and 11 illustrating the relative normal diameter of the head in relation to the screw diameter for ⅝" and ¾" hexagonal nuts;

Fig. 13 is a detail perspective view of a modified form of nut embodying the invention; and Fig. 14 is a plan view of a partly formed blank from which is made a hexagonal nut embodying the modified form of the invention shown in Fig. 13.

Referring to the drawings, the improved nut of the present invention is formed from a single piece of sheet metal stock, of desired thickness, and shaped to provide a tubular screw-receiving barrel 10 and an integral polygonal head 11 surrounding a major portion of the barrel. As herein illustrated the head is hexagonal sided having opposed flat sides or walls 12 though it will be understood that it may be of other polygonal shape. The barrel 10 is internally threaded as at 13 for threaded engagement with a screw 14 which may be of standard design, and preferably the barrel is of greater axial length than the depth of the head 11 to provide a maximum load-bearing engagement with the screw for any particular installation for which the nut may be designed.

To obtain maximum strength in the nut, the head 11 is preferably continuous concentrically of the barrel and integrally joined to the barrel at one end by a well rounded bight portion 15 of gradual increasing thickness from the barrel or bushing 10 outwardly to the head. Preferably, the outer surface of the bight portion 15 is semicircular or nearly so, the center of the radii of curvature 16 of which preferably lies within the head flange 11 rather than in the space between the barrel 10 and head 11 particularly along and adjacent to the diameters across the flat sides of the head 11 as shown in Fig. 6.

The side walls 12 of the head 11 are scalloped shaped in horizontal cross section as shown in Fig. 4, each wall being thicker at its center, as indicated at F (Fig. 8) and being substantially thicker than the thickness of the barrel stock, indicated at E (Fig. 8). Preferably the sides 12 of the head 11 have bearing engagement with the outer wall of the barrel 10 in the region of their thickened portions, such bearing engagement being on radii normal to and bisecting the sides 12 of the head so as to provide opposed circumferentially spaced bearing contact with the barrel. This provides an extremely rigid head flange capable of resisting distortion by tortional forces, as for example as when applying a wrench to the head to turn the nut on a screw.

In such constructions of sheet metal nuts where maximum strength of the head is not required, the side walls 12 may be slightly spaced from the barrel, but in no case is such spacing to be greater than the thickness of the metal from which the nut is formed.

Furthermore, the provision of the thickened head walls provides a work-bearing surface 17 of greater area than would be the case if the head walls and barrel were of uniform thickness. In cases where the length of the barrel is the same as the depth of the head, the total work-bearing surface of the nut approximately equals the work-bearing surface of a standard solid nut.

A nut so constructed may conveniently be formed by drawing a tubular barrel 10 from a flat piece of sheet metal stock leaving a laterally extending flange at one end, and thereafter upsetting the metal of the flange by cold-pressing it in a die, to fold it around the barrel. In this pressing operation the metal of the flange flows outwardly into the head walls 12, thus providing the thicker and stronger walls and increased area of the work-bearing surface 17.

Advantageously the head 11 is of such size and relation to the barrel or bushing 10 as to have the above stated characteristics, and also to provide a head to be engaged and turned by a standard set wrench for a solid hexagonal nut of the same screw diameter size. This is particularly advantageous in certain installations, for example as shown in Fig. 7, wherein work pieces 1 and 2 are secured together in fastened relation, one of which has a recess 3 designed to receive the head 11 of the nut and a socket wrench 4. By making the head 11 of a size equal to the size of similar standard solid nuts for any given screw diameter, they may replace such standard solid nuts in most, if not all installations.

In order to maintain the above described structural characteristics and relationship it is important to maintain a definite relationship between the screw diameter A (Fig. 8) and the normal diameter D of the head 11, across the flat sides. For nuts of all sizes up to screw diameters of ¾ of an inch, the normal diameter D should not exceed the screw diameter by more than ⅜ of an inch. Except for the smallest size nut, i. e. #8 having a screw diameter of 0.164 inch, all sizes of nuts have a normal diameter D across the flats of less than twice the screw diameter A. This provides that the inner face of the walls of the head will engage or lie closely adjacent to the outer surface of the barrel 10 and will not be spaced from the barrel 11 by more than the thickness of the sheet metal stock from which the nut is formed.

Sheet metal nuts embodying the invention may be made in sizes ranging from #8 to ¾ inch nuts or larger, as desired. For purposes of illustration there are illustrated and described the relative normal and screw diameters of a series of eleven nuts ranging from #8 to ¾ inch size.

In Fig. 9 there is illustrated the relative screw diameter A and normal diameter D across the flats of four nut sizes conveniently identified as #8, #10, #12 and ¼", having screw diameters A of 0.164"; 0.190"; 0.2160" and 0.250", respectively. The normal diameters D of these nuts across the flats is equal to A plus three-sixteenths (³⁄₁₆) of an inch for each size.

In Fig. 10 there is illustrated the relative screw diameter A and normal diameter D across the flats of two nut sizes, namely ⁵⁄₁₆" and ⅜" having screw diameters A of 0.3125 inch and 0.3750 inch, respectively. The normal diameter D of these nuts across the flats is equal to A+0.250 inch for each nut size.

In Fig. 11 there is illustrated the relative screw diameter A and normal diameter D across the flats of three nut sizes designated ⁷⁄₁₆, ½ and ⁹⁄₁₆ and having screw diameters A of 0.4375 inch, 0.500 inch and 0.5625 inch, respectively. The normal diameter D of these nuts across the flats is equal to A+0.3125 inch for each size.

Similarly in Fig. 12 there is illustrated the relative screw diameter A and normal diameter D across the flats of two nut sizes designated ⅝ and ¾ having screw diameters A of 0.625 inch and 0.750 inch, respectively. The normal diameter D of these nuts across the flats is equal to A+0.375 inch for each size.

The sheet metal nut of the present invention is further characterized in that the screw diameter of the barrel is approximately equal to or greater than any radii of the head bisecting one of the sides 12.

A slightly modified form of the invention is shown in Figs. 13 and 14, wherein the walls of the head 11 are not continuously joined but are formed of rectangular sections 12ᵃ folded around the barrel 10, the walls having abutting meeting edges 12ᵇ. This form of the invention is not as desirable for nuts of most of the sizes described above due to the fact that the head 11 lacks the strength of continuous walls as in the embodiment shown in Figs. 1 to 6. However, it is of advantage in the manufacture of certain larger sizes of nuts from heavier stock.

It will be apparent that the invention provides a novel sheet metal nut for screw-threaded fastenings, which is extremely strong in its load-bearing engagement with a screw as well as the ability of the head to resist distortion under ordinary torsional force. As stated above, the relatively long screw-receiving barrel 10, which may and preferably does exceed the length of the head, provides maximum load-bearing engagement with a screw threaded therein. The provision of the surrounding, close-fitting, polygonal head, whose normal diameter has the relation to the screw diameter stated above, results in an unusually strong head flange, the walls of which are thicker than the normal thickness of the metal stock from which the nut is made. Furthermore, it has the advantage of providing a polygonal nut head of standard size so that the nut may replace standard solid forged nuts when desired.

Although I have illustrated and described two embodiments of the invention, it is to be understood that the invention is not restricted thereto as the scope of the invention is best defined in the appended claim.

I claim:

A sheet metal nut having a circumferentially continuous polygonal head and a coaxial tubular screw-receiving barrel, said head providing a wall surrounding said barrel and having bearing engagement therewith throughout peripherally spaced areas normal to the side faces of said head, said wall being of greater thickness than the wall of said barrel and being joined to said barrel by a substantially semi-circular bight portion, the center of the radius of curvature of which lies in said head.

ARTHUR W. KIMBELL.

REFERENCES CITED

The following references are of record in the file of this patent:

UNITED STATES PATENTS

| Number | Name | Date |
|---|---|---|
| 1,211,486 | Pickop | Jan. 9, 1917 |
| 1,265,709 | Dies | May 7, 1918 |
| 2,005,348 | Michell | June 18, 1935 |
| 2,154,174 | Marchou (b) | Apr. 11, 1939 |
| 2,287,691 | Marchou (a) | June 23, 1942 |
| 2,347,852 | Thompson | May 2, 1944 |
| 2,460,721 | Thompson | Feb. 1, 1949 |

OTHER REFERENCES

American Machinist, Aug. 11, 1898.